(12) United States Patent
Karren et al.

(10) Patent No.: US 8,928,190 B2
(45) Date of Patent: Jan. 6, 2015

(54) SYSTEM AND METHOD FOR ACTIVATING AN ISOLATED DEVICE

(75) Inventors: Kyle Karren, Fairport, NY (US);
Athanasios Gkourlias, Rochester, NY (US)

(73) Assignee: Ultralife Corporation, Newark, NY (US)

( * ) Notice: Subject to any disclaimer, the term of this patent is extended or adjusted under 35 U.S.C. 154(b) by 841 days.

(21) Appl. No.: 12/981,773

(22) Filed: Dec. 30, 2010

(65) Prior Publication Data

US 2011/0156497 A1  Jun. 30, 2011

Related U.S. Application Data

(60) Provisional application No. 61/291,414, filed on Dec. 31, 2009.

(51) Int. Cl.
*H01H 3/00* (2006.01)
*H01M 2/10* (2006.01)
*H01M 10/48* (2006.01)
H01M 10/052 (2010.01)
H01H 36/00 (2006.01)

(52) U.S. Cl.
CPC .......... *H01M 2/1022* (2013.01); *H01M 10/052* (2013.01); *H01H 36/0006* (2013.01); *H01M 10/48* (2013.01)
USPC ...................................................... 307/139

(58) Field of Classification Search
USPC ........................................................ 307/139
See application file for complete search history.

(56) References Cited

U.S. PATENT DOCUMENTS

| | | |
|---|---|---|
| 5,250,904 A | 10/1993 | Salander et al. |
| 5,758,224 A | 5/1998 | Binder et al. |
| 6,121,753 A | 9/2000 | Walker et al. |
| 6,208,115 B1 | 3/2001 | Binder |
| 6,270,916 B1 | 8/2001 | Sink et al. |
| 7,190,147 B2 | 3/2007 | Gileff et al. |
| 7,586,289 B2 | 9/2009 | Andruk et al. |
| 8,299,656 B2 * | 10/2012 | Allard et al. ................ 307/154 |
| 2004/0012374 A1 | 1/2004 | Kamenoff |
| 2004/0115528 A1 | 6/2004 | Helmich |
| 2004/0257037 A1 * | 12/2004 | Hartung et al. .............. 320/114 |
| 2005/0194927 A1 * | 9/2005 | Gileff et al. .................. 320/112 |
| 2005/0196667 A1 | 9/2005 | Brand |
| 2007/0273333 A1 * | 11/2007 | Andruk et al. ............... 320/135 |
| 2009/0027056 A1 * | 1/2009 | Huang et al. ................. 324/439 |
| 2010/0302757 A1 * | 12/2010 | Bennett, Jr. ................. 361/819 |
| 2011/0269029 A1 * | 11/2011 | Gellett et al. ................ 429/401 |
| 2011/0304474 A1 * | 12/2011 | Salamitou et al. ........ 340/854.6 |

OTHER PUBLICATIONS

Alcatel Press Release Jan. 14, 2004; Alcatel and Doughty Hanson announce the closing of the Saft transaction; 1 page.
Deparment of Defense Handbook; MIL-HDBK-454A, Nov. 3, 2000; 194 pages.
Military Regulation Sheet regarding Lithium Batteries; GPM 2000-002, DTG 161901Z JUN 00; 3 pages.

(Continued)

*Primary Examiner* — Jared Fureman
*Assistant Examiner* — Duc M Pham
(74) *Attorney, Agent, or Firm* — Duane C. Basch; Basch & Nickerson LLP (57) ABSTRACT

Disclosed is a system and method for controlling the activation of isolated circuitry, and more particularly complete discharge devices for batteries, and similar circuits that are enclosed within sealed housings.

21 Claims, 4 Drawing Sheets

(56) References Cited

OTHER PUBLICATIONS

ITT Industries; Specification Sheet for C&K AYZ Series Miniature Slide Switches; 3 pp. I-46-I-48; ittcannon.com; no date available.

Ultralife Batteries; Transport Regulations for Lithium, Lithium Ion and Polymer Cells and Batteries; pp. 1-9; Jan. 11, 2005 Rev. K; UMB-5120; c. 2003-2005 Ultralife Batteries, Inc.

* cited by examiner

SYSTEM AND METHOD FOR ACTIVATING AN ISOLATED DEVICE

This application claims priority under 35 U.S.C. §119, from U.S. Provisional Application No. 61/291,414 for "SYSTEM AND METHOD FOR ACTIVATING AN ISOLATED DEVICE," filed on Dec. 31, 2009 by Kyle Karren and Athanasios Gkourlias, which is hereby incorporated by reference in its entirety.

The present disclosure is directed to controlling a device/circuit contained within a hermetically sealed unit using a non-mechanical stimuli, and more particularly controlling a complete discharge circuit within a sealed housing, in order to neutralize a battery's potential using a non-contact external actuation.

BACKGROUND & SUMMARY OF DISCLOSURE

A complete discharge device (CDD) generally consists of a resistive load component and an activation component to complete a resistive short circuit between the terminals of a battery, for the purpose of discharging residual power. The incorporation of a CDD into a lithium battery is primarily intended to expend the residual energy remaining in an otherwise functionally depleted battery, thereby making the lithium non-reactive and inert. Interestingly, a study conducted on various lithium-sulfur dioxide ($Li$—$SO_2$) batteries by the U.S. Army Communications-Electronics Command (CECOM) shows that $Li$—$SO_2$ batteries when discharged through the use of a CDD, to a voltage of less than one volt, per cell, are considered to be non-reactive. This fact is significant because in most regions, non-reactive lithium-sulfur dioxide meets the criteria as non-hazardous waste for disposal purposes, but only when equipped with a CDD. The absence of a CDD often necessitates a disposal process including costly procedures for the handling and disposition of hazardous waste materials. Therefore, the complete discharge of a lithium sulfur dioxide battery, as well as similar batteries, is believed essential to alter the classification of the battery from hazardous to non-hazardous waste. Accordingly, the disclosed embodiments provide for controlling or activating a complete discharge circuit within a sealed housing, for example, by positioning a magnetic field adjacent the sealed battery housing to activate the complete discharge circuitry.

A Conventional CDD includes various switches in combination with an activation method to short circuit the battery terminals using a power dissipation means, such as a load resistor. Examples of batteries with conventional complete discharge devices are the BA-5590 (Li/S02) battery, as manufactured by Saft America, Inc. Bagvolet, France and the BA-5390 as manufactured by Ultralife Corporation, Newark, N.Y. For example, spring contacts biased toward each other, and an insulating pull-tab arrangement between them, are used in conjunction with a resistive discharge circuit. It is also believed that other circuit activation means include a rigid plastic rod that is pushed into the battery to activate the discharge operation (e.g., Li/S02 battery cells formerly manufactured by Hawker Energy Products, Inc., now EnerSys Energy Products Inc., of Warrensburg, Mo.).

Nonetheless, while suitable for battery energy depletion, the known schemes include inherent shortcomings with the use of an insulating pull-tab, or a rod, both from a manufacturing, as well as a performance and utility standpoint. For instance, if the spring contact loses its bias, the removal of the pull-tab would fail to activate the circuit. Similarly, the tab material must be resistant to deformation or penetration by the contacts, and must be resistant to movement until complete discharge is required. A further potential problem, when using a tab or material between the contacts, is that residual material, oxidation and/or corrosion may accumulate on the contacts thereby prohibiting the activation of the discharge circuit. Finally, and perhaps foremost, an inserted tab is generally invasive within the battery case itself, thereby requiring an aperture for it to pass through; consequently, the cells have limited protection from the ambient environment due to a breach of the enclosure, most notably submersion in a liquid.

Batteries used in military application, for example, are often required to endure exposure to, or immersion in, salt water to a considerable depth without discharging. Also, military specifications may require that certain types of lithium based batteries be manufactured with a CDD that is manually activated to assure complete discharge once the battery has been taken out of service. It should be noted that it is also desirable, and possibly required, to include a state of charge indicator that can be activated on demand, to determine the remaining charge/capacity (or presence thereof) within in the battery.

One of the potential alternatives to mechanical actuation of a CDD in a battery relies on the use of light to activate a photo-sensitive switch. However, this has, in many cases, proved to be inadequate due to the probability of mistakenly discharging a battery with inadvertent light reaching the sensor and unintentionally activating the CDD. Moreover, in some cases, the intensity of the ambient light breaches the shutter used to shield the sensor. Obviously, the converse is equally problematic wherein there is insufficient ambient light available when complete battery discharge is desirable. Although a light source may be built into the battery to assist in activating the complete discharge device, the need for a built in light source adds superfluous cost and complexity to a single use, simplistic battery design.

In accordance with an aspect of the present disclosure, the use of an external non-mechanical stimuli, such as external fields (e.g., magnetic fields) provides for remote activation for controlling the state of a CDD located within a sealed battery housing. In one example an electro or permanent magnetic field source is directed through a non-ferrous region of a battery housing to activate the operation of an internal circuit, CDD and/or state of charge indicators, for example. Accordingly, the magnetic field is encouraged to permeate the outer housing and thereby mitigate the need to physically pass through the housing to activate a discharge circuit.

In one embodiment, magnetic field sensors may include non-contact sensing devices based on the Hall-effect principle, whereby a voltage differential is sensed in a conductor as a function of the presence of either a parallel or perpendicular magnetic field, which in turn forward biases a solid state switch. Consequently, magnetic fields are able to pass directly through non-ferrous materials, thereby eliminating the need for direct physical contact to activate a switch connected to the CDD. However, a Hall-effect switch requires power in order to sense the change in field direction, and the actual Hall sensor must be positioned between the poles of the external magnet, which may lead to a unique battery housing form factor. As the Hall-effect switch is an active component, it provides a constant power drain during the entire life cycle of the battery, thereby reducing the power available to operate a device. Accordingly it may not be a suitable alternative in many applications.

Several disclosed embodiments employ a passive, reed type switch within a sealed housing to complete the discharge circuit when activation is required. The reed switch is a continuity device consisting of a pair of electrical contact points located on at least two metal fingers having the contact end portions separated by a small air gap on the distal end and having the proximal ends hermetically sealed within a tubular glass envelope. At least one of the reed fingers is made from a magnetic/conductive material and is operable when positioned in the proximity of an applied magnetic field, for example, a permanent magnet or an electro-magnet. Such a switching device is passive and therefore does not require or draw power in order to be operational. Conventionally, there are two reed switch configurations: "normally open" and "normally closed" positions. The metal reeds on a normally open (NO) switch stay open when there is no magnet field in proximity of the switch. In the presence of a magnetic field, the contacts of a normally-open reed switch will close thereby making contact. Conversely, a normally-closed (NC) reed switch is closed when it is not near a magnet field; but will open the contacts in the presence of a magnet, thereby breaking contact.

The aforementioned magnetic field sensors are not considered to be exclusive to a CDD, on the contrary isolated or externally remote activation of an internal control circuit is well suited for devices such as cameras, computers, GPS, cell phones and the like that may be further adaptable for use in hostile environments by sealing the devices in a housing that is only permeable to a magnetic or other field. Therefore, any devices operating in a sealed environment, could be activated (and/or deactivated) by non-mechanical stimuli such as magnetic sources outside the sealed unit, that would trigger or displace magnetically sensitive components sealed within the unit.

It is desirable to provide a system for activating a device or circuit in a sealed housing that enables activation using an externally applied non-mechanical stimuli, such as magnetic fields, visible light, infra-red, acoustics, pressure, or radio frequencies, for example. It is further contemplated that in accordance with an alternative embodiment, a CDD may include internal battery terminals connected to the external battery terminals, whereby an internal switch provides an electrical connection to the exposed terminals and, upon disposal, the switch is placed in an open state. Additionally, it is conceivable to provide a resistive discharge path in combination with an external terminal disconnection means from the internal battery.

In accordance with embodiments described herein, there is provided a battery system including a complete discharge device within a sealed housing, comprising: (a) a passive switch component sensitive to a non-mechanical stimuli, said switch component (e.g., reed switch) located within the sealed housing; (b) a magnetic field source (e.g., magnetic coil, permanent magnet), said magnetic field source being physically separated from said switch component by the housing, wherein said continuity component is responsive to a variation in the magnetic field caused by relative motion between the magnetic field source and switch component; and (c) a complete discharge circuit, located inside the housing and operatively controlled by said switch component, such that upon activation by said switch component the complete discharge circuit depletes the energy potential within the battery.

According to further aspects of embodiments described herein there is provided a system for activating a device, comprising: (a) a passive switch, said switch being responsive to a non-mechanical stimuli (e.g., a change in a local magnetic field); (b) a source of non-mechanical stimuli, the source located at a position separated from said sensor and the device; and (c) a circuit, connected to said passive switch wherein the circuit is controlled by said switch and where said switch is responsive to a variation in the non-mechanical stimuli.

According to yet another aspect of the disclosed embodiments, a method for controlling the activation of continuous discharge device in a sealed battery housing, comprising: (a) varying a non-mechanical stimuli (e.g., a magnetic field), using a source located outside the housing and physically separated from the continuous discharge device, the housing being permeable to a magnetic field; (b) detecting the variance of the magnetic field using a passive switch component; and (c) in response to the switch component (e.g., SCR or triac), activating the continuous discharge device. It should be appreciated that instead of an SCR, any solid state or mechanical relay may also be used in order to connect the discharge device In embodiments, a NO/NC reed switch may be used and each lead connected to the activation or deactivation pin, respectively.

BRIEF DESCRIPTION OF THE DRAWINGS

The embodiments disclosed herein may take form in various components and arrangements of components, and in various steps and arrangements of steps. The drawings are only for purposes of illustrating the embodiments and are not to be construed as limiting the disclosure or the appended claims.

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

For a general understanding of the embodiments, reference is made to the drawings. In the drawings, like reference numerals have been used throughout to designate identical or equivalent elements. It is also noted that the various drawings illustrating the embodiments are not drawn to scale and that certain regions may have been purposely drawn disproportionately so that the features and concepts disclosed herein may be properly illustrated.

Figure 1:
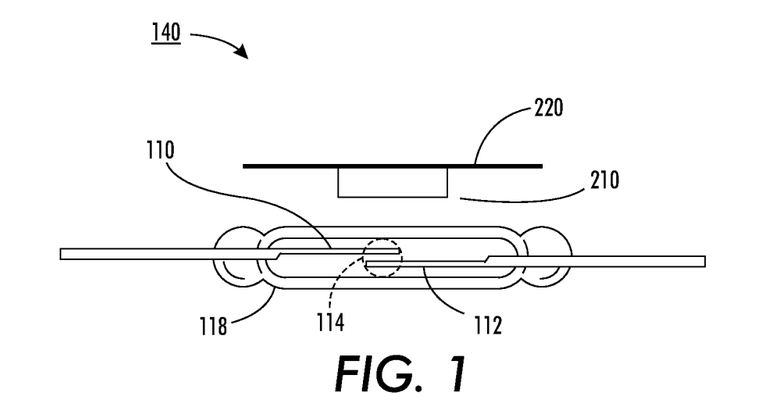
FIG. 1 illustrates a reed switch and an exemplary magnetic field source.
Figure 2:
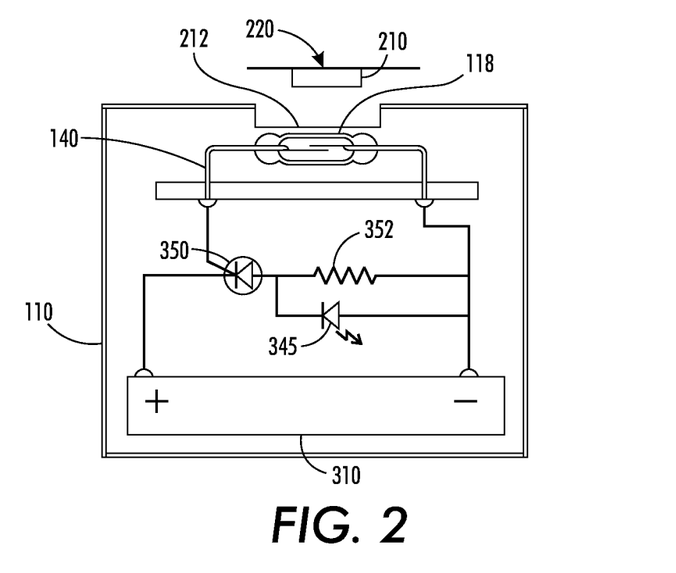
FIG. 2 depicts an overview of a magnetic field acting to initiate a circuit.

Referring to FIG. 1, there is shown an example of a magnetic field source 210 in relation to a sensor or switch 140. Although various magnetic materials may be employed as the source of the magnetic field, it is believed that commonly available ferromagnetic materials (e.g., iron, nickel, cobalt) have a suitable flux density and coercive force for non-mechanical activation of a switch component. The arrangement of the magnet assembly, depicted in FIG. 1, is a thin, possibly flexible strip of ferromagnetic material mounted or affixed to a pliable tab or label 220. Tab 220 may have pressure sensitive adhesive thereon or similar means permitting it to be removably attached to a housing or similar structure in proximity to the battery. Referring also to FIG. 2, the mounting of the magnetic field source (e.g., magnet) 210 on tab 220 facilitates the removal of the magnetic field source 210 as the tab is pulled away from housing 110, along with magnetic field source 210, from within retention depression 212.

Switch 140 may include a reed type switch that includes a passive mechanical contactor for electrical current. In one embodiment, reed switch 118 comprises two identical flat ferromagnetic reeds, 110 and 112, sealed in a dry inert-gas atmosphere within a glass capsule or similar, thereby protecting the contacts from contamination. The reeds are affixed in the capsule in a cantilever form so that their free ends overlap and are separated by a small air gap. The reed switch includes a pair of electrical contact points on metal fingers separated by a small air gap on the distal end and having the proximal ends hermetically sealed within a tubular glass envelope. At least one of the reed fingers, or at least a portion thereof, is made from a magnetic/conductive material and is operable or moves when positioned in the proximity of an applied magnetic field, for example, a permanent magnet or an electromagnet. More specifically, when a magnetic field is generated parallel to the reed switch, the reeds become flux carriers in a magnetic circuit and the overlapping ends 114 of the reeds become opposite magnetic poles, which attract each other. If the magnetic force between the poles is strong enough to overcome the restoring force of the reeds, the reeds are drawn together, thus providing electrical continuity between the contacts. The reed-type switching device is passive and, therefore, does not require or draw power in order to be operational.

As noted previously, there are two types of reed switches: "normally open" and "normally closed" reed switches. The electrically conductive reeds, 118 and 112 respectively, on a normally closed switch open only when there is a magnetic field near the switch. In the disclosed embodiment, given the presence of a magnetic field, the contacts of a NC reed switch will remain open. Reed switch 140 contains at least a pair of electrically conductive metal reeds, which have contact end portions 114 separated by a small air gap when the switch is open (non-conducting). Typically, the reeds are each hermetically sealed in opposite ends of tubular glass envelope of switch 118. Notably, the hermetic sealing of a reed switch 140 makes them suitable for use in explosive atmospheres, where electrical arcing from conventional switches may constitute a hazard. However, cost considerations may inevitably eliminate the glass envelope of the reed switch, as they are further located within the sealed battery enclosure thus making the envelope redundant.

Again, it is noted that a battery with enclosed electronics is only one example of utilizing a non-mechanical stimuli such as magnetic activation to control an isolated switch. Although described relative to the activation of circuitry within a sealed battery housing, the disclosed embodiments are also applicable to other embodiments where an isolated or embedded switch is to be activated. In the following figures, more detail is provided regarding the battery related embodiments described above.

Referring again to FIG. 2, sealed battery 310 is enclosed within housing 110, along with various circuit components to completely discharge battery 310 upon user demand. Reed switch 140 provides a non-invasive method to control the internal electronics necessary for discharging the electrical potential of the battery. Accordingly, sealed housing 110 encloses and isolates the complete discharge device or circuits that are held in an inactive status during the life of battery 310, by an ever present externally applied magnetic field source 210 situated within depression 212 of the battery housing 110, located in the proximity of internal reed switch 140.

In the absence of a magnetic field, NC reed switch 140 closes, thereby providing a voltage to trigger silicon controlled rectifier (SCR) 350, or a similar semi-conductor device, which is "locked" or forward biased to allow current to pass through load resistor 352 until battery 310 is depleted of substantially all electrical potential. Notably, the magnetic source 210 and reed switch 140 should be in place before the CDD is connected to assure no premature discharge of the battery.

Figure 3:
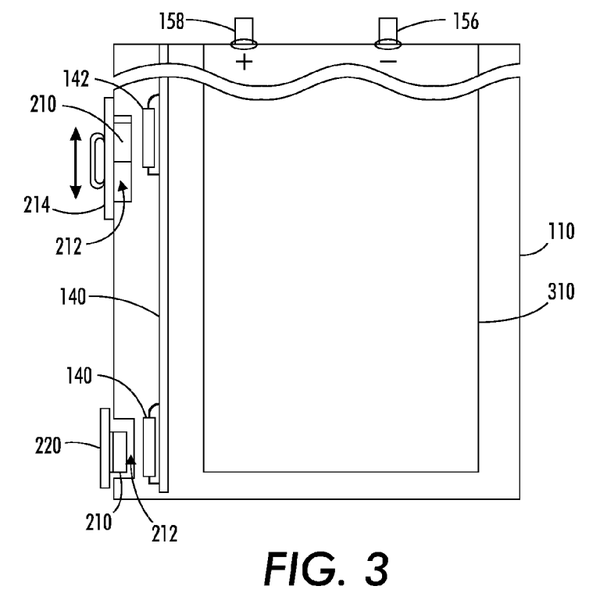
FIG. 3 is a partial cutaway view showing the circuit board to the magnet source orientation, in accordance with the embodiment of FIG. 2.

In the exemplary embodiment depicted in FIG. 3, a magnetic field source 210 is operatively affixed within depression 212, at a position on the outside of sealed housing 110, in proximity to reed switch 140. Reed switch 140 (e.g., a normally-open or normally-closed device) may be used as a passive switch to conduct an electrical current that is subsequently used to forward bias a semi-conductor component, such as a thermister, selenium controlled rectifier (SCR), a triac, or insulated gate bipolar transistor (IGBT) for example, for the purpose of activating a complete discharge device. Alternatively, reed switch 140 may be a nominally open switch and on its own operate in the manner of a switch suitable for providing a limited current flow directly through resistor 352, in response to variation in an externally applied magnetic field. The magnetic field source (magnet or magnetic coil) used to actuate the sensor 140 can be provided by most any object that exhibits the characteristics of a magnetic field. However, in consideration of power conservation an electro-magnet, while providing substantially more magnetic force, could potentially yield an undesirable continual current drain on the battery. The same would be true for a dynamic electronic switch, such as a Hall-effect detector, which necessitates a continual standby circuit drain on the battery or other power source to be operable. In this regard mechanical reed switch 140 provides a significant advantage as a passive switching device, dependent only upon a change in magnetic field for operability.

As further illustrated in FIG. 3 housing 110 is designed to be impervious or impermeable to the surrounding atmosphere, especially salt water, hence the requirement for a non-invasive and passive external control of battery operation. As a further aspect of the embodiment, a second reed switch 142 could conceivably be associated with a circuit designed to indicate the remaining charge in the battery. In this situation, due to the current measurement required to ascertain the remaining battery power, a momentary switch 214 is activated by, for example, sliding magnetic field source 210, within cavity 212, over reed switch 142. Once the battery life is displayed a spring could return magnet 210, of momentary switch 214, to a neutral position, allowing reed switch 142 to return to the normally open position. Notably, this switch embodiment is adaptable to either normally closed or open operation, and can be momentary in either configuration.

Figure 4:
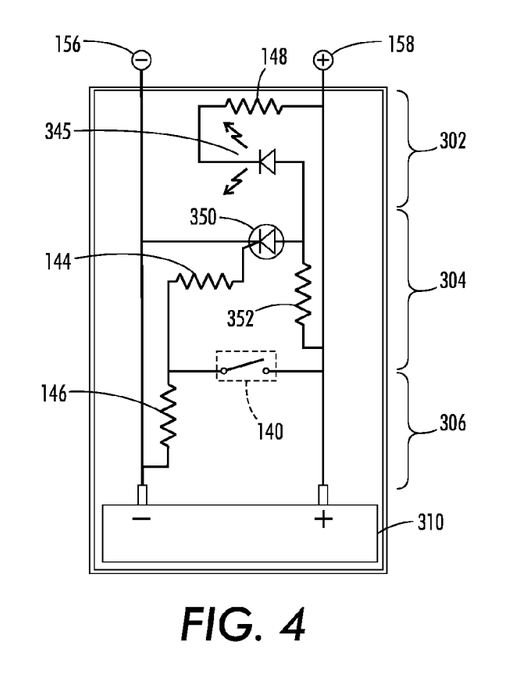
FIG. 4 is a functional electrical diagram illustrating an embodiment of a complete discharge circuit configuration.

Now, referring to FIG. 4, the electrical elements of an exemplary complete discharge device are presented, including as at least three functional elements; (i) switching circuit 306, (ii) complete discharging load connection 304 and (iii) discharge indicator 302. As previously noted, reed switch 140 essentially provides the trigger current from a voltage divider comprising resistors 146 and 144 to the battery current discharge circuit within section 304, in this case SCR 350. Load resistor 352 is used to dissipate the heat generated from the current of the residual battery power (watts), as a function of voltage times the current [P=(I)(E)]. Once triggered, SCR 350 will remain in a conductive state until the current drop across resistor 352 falls below 3 mA. Concurrently, as the residual power is being consumed and dissipated across resistor 352, LED 345 provides an indication of such dissipation, for example, being illuminated during discharging and turning off once the battery discharge cycle has been completed.

It will be appreciated by those skilled in the art that an electrical "latch" is preferred as the control for the CDD to assure complete or adequate discharge of the battery, wherein once discharge is initiated, regardless of any subsequent replacing of the magnetic field source 130, discharge continues to completion. Therefore, it is noted that when SCR 350 is turned on by a positive gate current it will remain in the latched and forward conductive state, independent of the gate current initially passed from reed switch 140, as long as the anode to cathode current remains above a specific holding level. For example, an industry standard SCR, such as C106 from Motorola and others, will conduct up to a maximum current of 4 amps (DC) and will subsequently turn off only when the current reaches a minimum holding level of 3 mA., which would be indicative of a fully discharged battery. Additionally, a visual discharge indicator, such as light emitting diode (LED) 345 is illuminated as long as current is being dissipated across load resistor 345 whereas at the time battery 310 is completely discharged LED 345, will be off.

Figure 5:
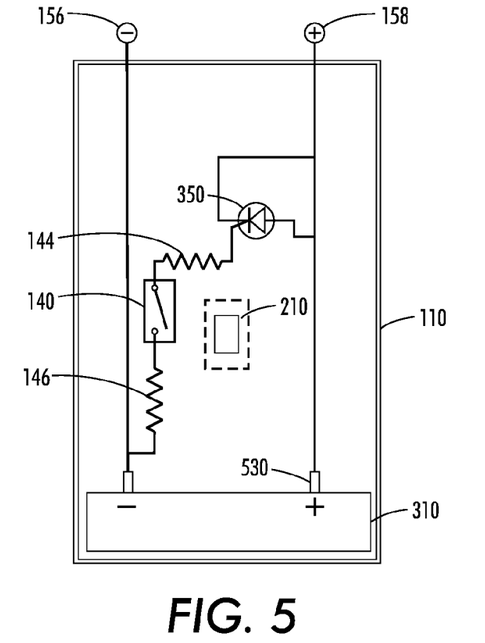
FIG. 5 is a functional electrical diagram illustrating an internal positive terminal connection/disconnection circuit configuration.

An alternative embodiment for the use of a magnetically activated reed switch 140, within battery case 110, is shown in the functional schematic of FIG. 5. Referring to FIG. 5, an internal connection, caused by switch 140 and SCR 350 results in the external terminal 158 to substantially be one and the same as the internal terminal 530 of battery cell 310. Alternatively, the same circuit within housing 110 could cause at least one of the battery terminals to be electrically isolated and disconnected from the external terminal 158 to prevent accidental discharge via a short circuit between the external terminals when not in service. Accordingly, FIG. 5 illustrates a general schematic including a battery terminal switching circuit whereby the DC power to positive terminal 530 is switchable from (i) an open external terminal for storage transporting and disposal to (ii) terminal 158 having positive power applied from internal terminal 530, when in use. As is evident in FIG. 5, SCR 350 provides the basis for positive external terminal 158 to be electrically connected and/or disconnected from the primary cell(s) of battery 310. When external magnet 210 is removed from battery case 110, reed switch 140 detects a change in the magnetic field and gates SCR 350 which, in turn, is forward biased to allow the terminal 158 to be electrically in connection to the positive terminal 530 of battery 310.

Figure 6:
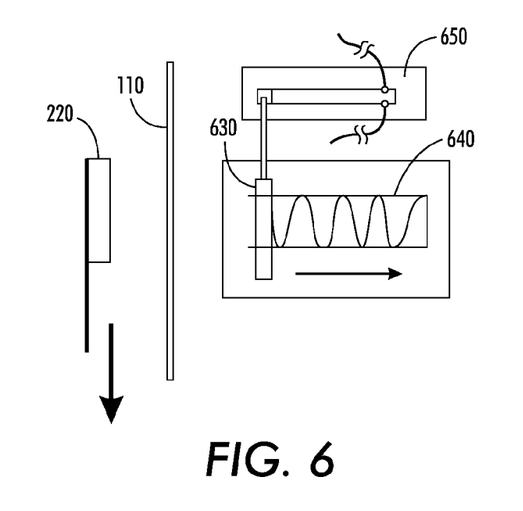
FIG. 6 is a conceptual illustration of a spring biased sliding magnet.

FIG. 6 is yet another example of a system for magnetically motivating a passive internal switching device that is sealed within a housing. Like the mechanically biased reeds of the earlier embodiments, actuator 630 is also a magnet and is physically connected to a spring-biased slider switch 650 to activate an associated circuit. The position of actuator 630 is determined by the magnetic attraction of actuator 630 to the magnetic field source 620 and the opposing force of the attached spring 640. When the magnetic field source 610 is moved a sufficient distance away from the actuator 630, the force of the spring 640 overcomes the magnetic field force and actuator 630 changes position to an off state. Magnetic field source 220 is mounted outside of housing 110 and is moveable. In this embodiment, actuator 630 comprises a simple magnet whereby the alignment of the poles with magnetic source 220 poles causes actuator 630 and thereby a contactor in switch 650 to move towards the closed direction. On the other hand, opposing pole alignment (e.g. N→S and S→N), in combination with spring 640 may be used to cause switch 650 to be held in a normally closed position.

Figure 7:
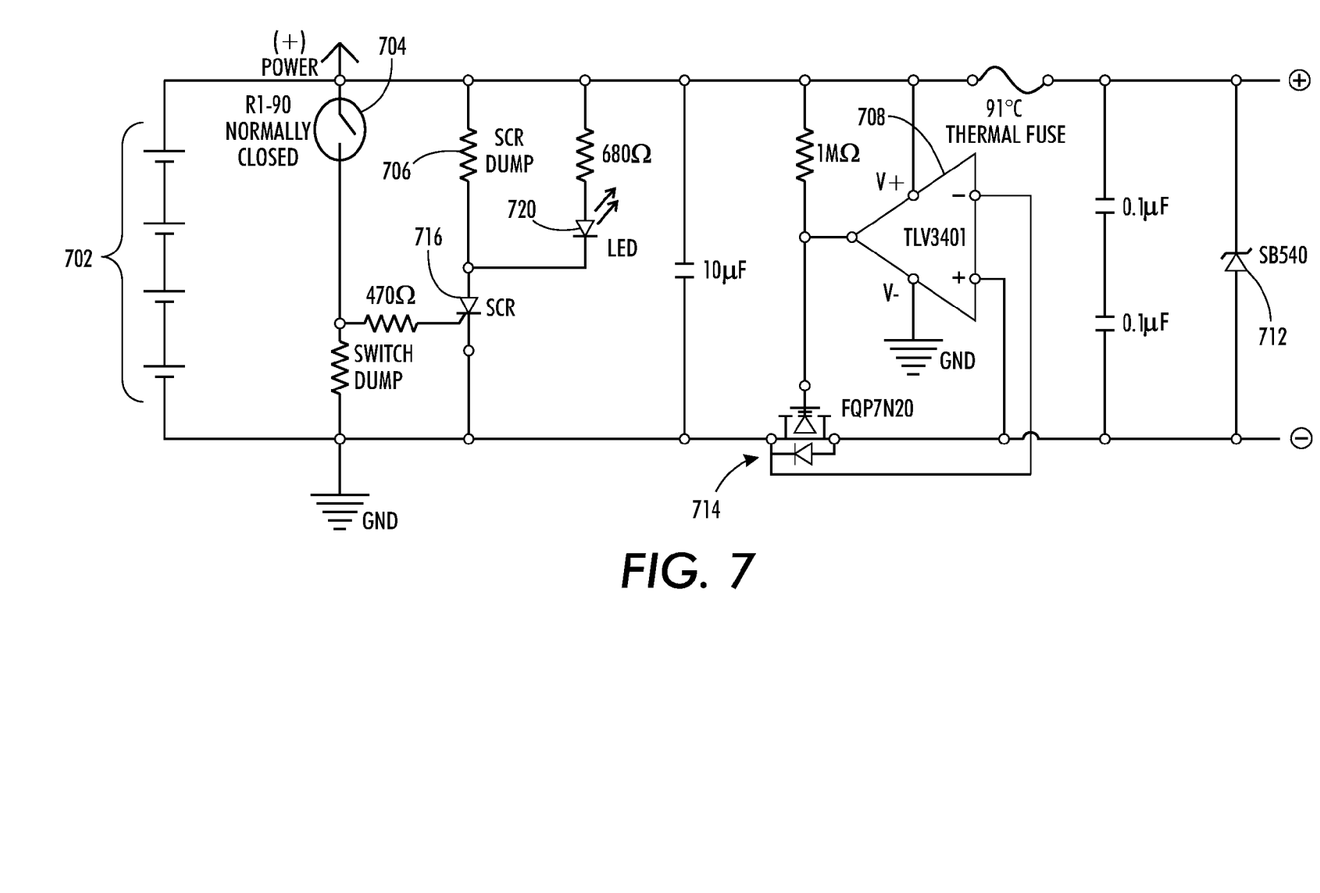
FIG. 7 is a schematic circuit including a field effect transistor

Referring next to FIG. 7, depicted therein is a circuit that may be used in accordance with the embodiments disclosed herein. Although the circuit symbols and labels depict particular characteristics of the components, it should be appreciated that such information is for purposes of describing the circuit, and that alternative characteristics or components may be used or substituted to accomplish a similar function. For example, the value of the SCR load resistor 706 could vary depending upon the battery and the desired rate of the discharge. In operation selenium controlled rectifier (SCR) 716 will forward conduct once the magnetic field is removed from normally closed reed or similar switch 704, which then opens, thereby placing the load resistor 706 directly across the terminals of battery 702, in order to bleed off any residual energy. Accordingly, light emitting diode 720 will be on as long as there is a voltage drop across load resistor 706. Concurrently, the disconnect circuit relies on comparator 708 to sense the opening of switch 704 in order to gate MOSFET 714, which in turn disconnects the internal ground return from the external negative terminal.

Although the various embodiments described herein are directed to the activation of a device or circuit in a sealed housing using a non-mechanical stimuli, for example, in response to a change in an externally applied magnetic field, it is understood that aspects of the disclosed embodiments may also be suitable for use with alternative energy types or fields.

While various examples and embodiments have been shown and described, it will be appreciated by those skilled in the art that the spirit and scope of the disclosure are not limited to the specific description and drawings herein, but extend to various equivalents thereof as well as other modifications and changes.

What is claimed is:

1. A battery system including a complete discharge device within a sealed housing, comprising:
   a passive switch component sensitive to a non-mechanical stimuli, said switch component located within the sealed housing;
   a magnetic field source, said magnetic field source being physically separated from said switch component by the sealed housing, wherein said switch component is responsive to a variation in the magnetic field caused by relative movement between the magnetic field source and switch component; and
   a complete discharge circuit, located inside the sealed housing and operatively activated by said switch component, such that upon activation by said switch component the complete discharge circuit depletes the energy potential within the battery.

2. The battery system of claim 1 further comprising a non-magnetic sealed housing, the housing providing a sealed enclosure of the battery and electrical components contained therein.

3. The battery system of claim 1 further including a state of charge indicator.

4. The battery system of claim 2 wherein the housing includes battery terminals.

5. The battery system of claim 2 wherein the magnetic field source is movable relative to the housing.

6. The battery system of claim 2 wherein the housing is impermeable to liquid.

7. The battery system of claim 2 wherein the housing is impermeable to gas.

8. The battery system of claim 1 wherein the magnetic field source includes a material exhibiting magnetic properties.

9. The battery system of claim 1 wherein the magnetic field source is an electromagnet.

10. The battery system of claim 1 wherein said passive switch component includes a reed switch, and where at least one of the reeds thereof is responsive to a magnetic field.

11. A system for activating a device, comprising:
a passive switch, said switch being responsive to a non-mechanical stimuli;
a source of non-mechanical stimuli, the source being located in a position separated from said sensor and the device;
a sealed housing, the housing assuring separation between the source and the switch; and
a circuit, connected to said passive switch and contained within the housing, wherein the circuit is activated by said switch and where said switch is responsive to a variation in the non-mechanical stimuli.

12. The system of claim 11 wherein the circuit includes a complete discharge device.

13. The system of claim 11 wherein the circuit includes a state of charge indicator for a battery.

14. The system of claim 13 wherein the circuit further includes the terminals of a battery to which the state of charge indicator is connected.

15. The system of claim 11 wherein the source is movable relative to the housing.

16. The system of claim 11 wherein the housing is impermeable to liquid.

17. The system of claim 11 wherein the housing is impermeable to gas.

18. The system of claim 11 wherein said source includes a magnetic field source and where said switch includes a magnetic material, the material being operatively positioned in the switch to cause a change in operation of the switch in response to a variation in the magnetic field.

19. A method for controlling the activation of a continuous discharge device in a sealed battery housing, comprising:
varying a non-mechanical stimuli, using a source located outside the housing and physically separated from the continuous discharge device, the housing being permeable to a magnetic field;
detecting, inside the sealed battery housing, a variance of the non-mechanical stimuli using a passive switch component; and
in response to the switch component, activating the continuous discharge device located inside the sealed battery housing.

20. The method of claim 19 where activating the continuous discharge device further comprises activating a state of charge indicator.

21. The method of claim 19 where varying the non-mechanical stimuli comprises moving a magnetic field source wherein motion of the magnetic field source causes a variance in a magnetic field to which the switch is exposed.

* * * * *